United States Patent [19]

Heasley

[11] 4,076,383
[45] Feb. 28, 1978

[54] MULTI-SIDED RETROREFLECTOR
[75] Inventor: James H. Heasley, Shaker Heights, Ohio
[73] Assignee: Ferro Corporation, Cleveland, Ohio
[21] Appl. No.: 652,236
[22] Filed: Jan. 26, 1976

Related U.S. Application Data
[63] Continuation-in-part of Ser. No. 635,634, Nov. 26, 1975.

[51] Int. Cl.² .............................................. G02B 5/124
[52] U.S. Cl. ....................................... 350/103; 350/97; 404/14
[58] Field of Search ................. 350/103, 97, 112, 102, 350/106, 107; 404/14

[56] References Cited
U.S. PATENT DOCUMENTS

| | | | |
|---|---|---|---|
| 3,332,327 | 7/1967 | Heenan | 350/103 |
| 3,450,459 | 6/1969 | Haggerty | 350/103 |
| 3,762,825 | 10/1973 | Reusser | 404/16 |
| 3,799,646 | 3/1974 | Footchkar | 350/103 |
| 3,883,224 | 5/1975 | Tanaka | 350/103 |
| 3,954,324 | 3/1977 | Arnott et al. | 350/106 |

Primary Examiner—John K. Corbin
Assistant Examiner—B. W. delos Reyes
Attorney, Agent, or Firm—Milton L. Simmons; Wesley B. Taylor

[57] ABSTRACT

A multi-sided retroreflective body is disclosed having at least two retroreflective faces adapted to intercept light. Each reflective face is tilted in the same general direction about a lower portion angularly away from a vertical plane and is angularly related in a horizontal plane with respect to another vertical plane disposed substantially at right angles to the direction of such light. All four angles are so interrelated as to make the faces substantially optically equivalent, such that light retroreflected by the faces is directed in return paths substantially parallel to that of the intercepted light. Preferably, the reflective faces have light-reflecting units formed from three mutually perpendicular surfaces. In this case, a related advantage results in that all of the faces of the retroreflective body may be formed with the same forming tool without affecting their optical equivalence.

21 Claims, 18 Drawing Figures

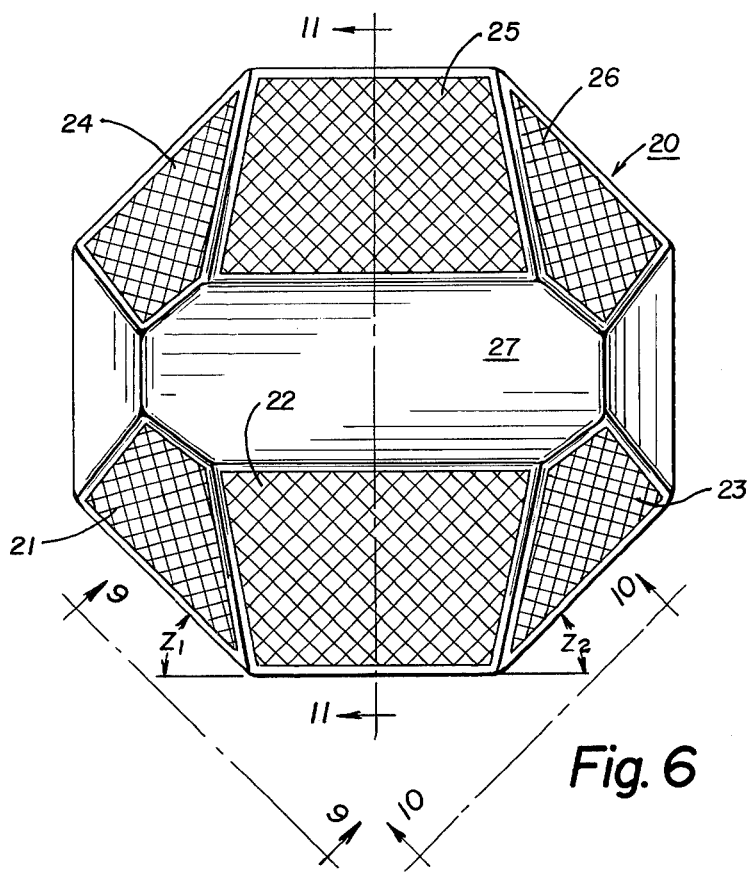
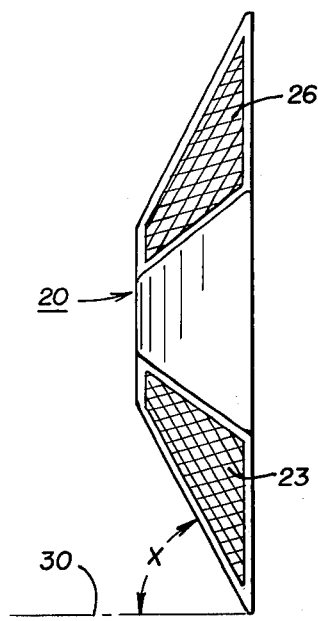
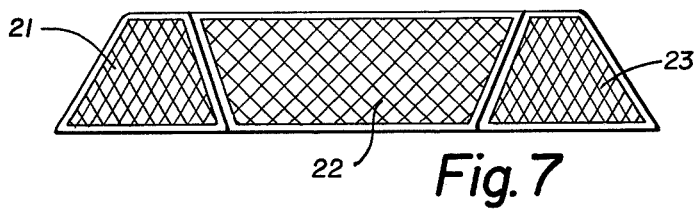
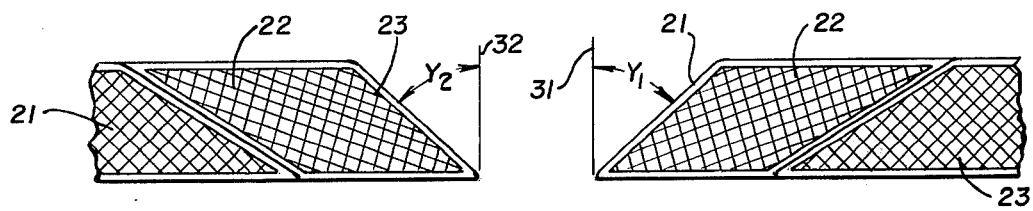
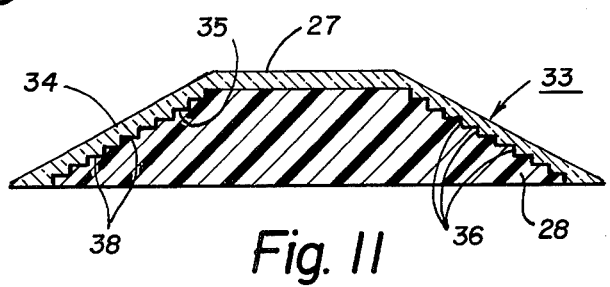
Fig. 6
Fig. 8
Fig. 7
Fig. 9
Fig. 10
Fig. 11

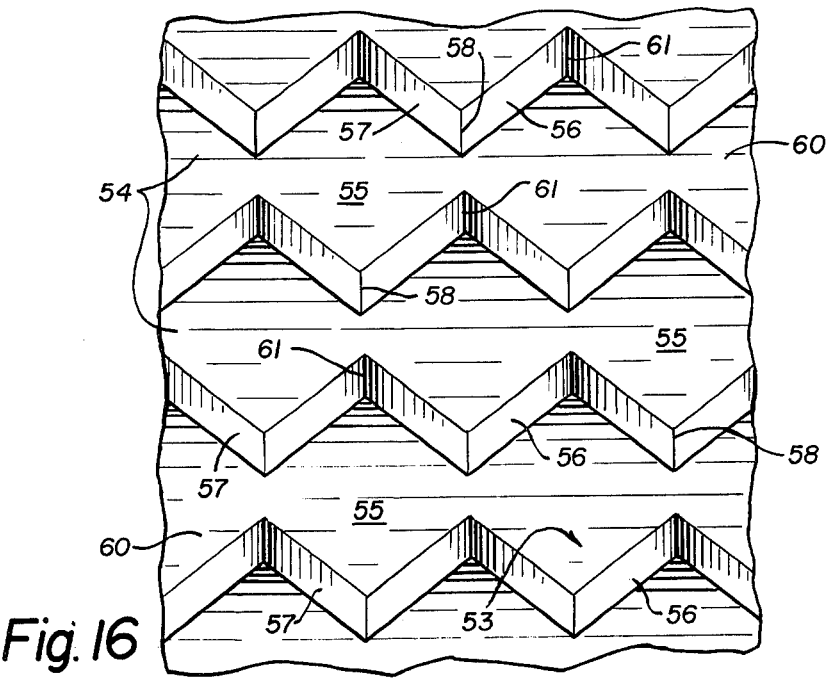
Fig. 16
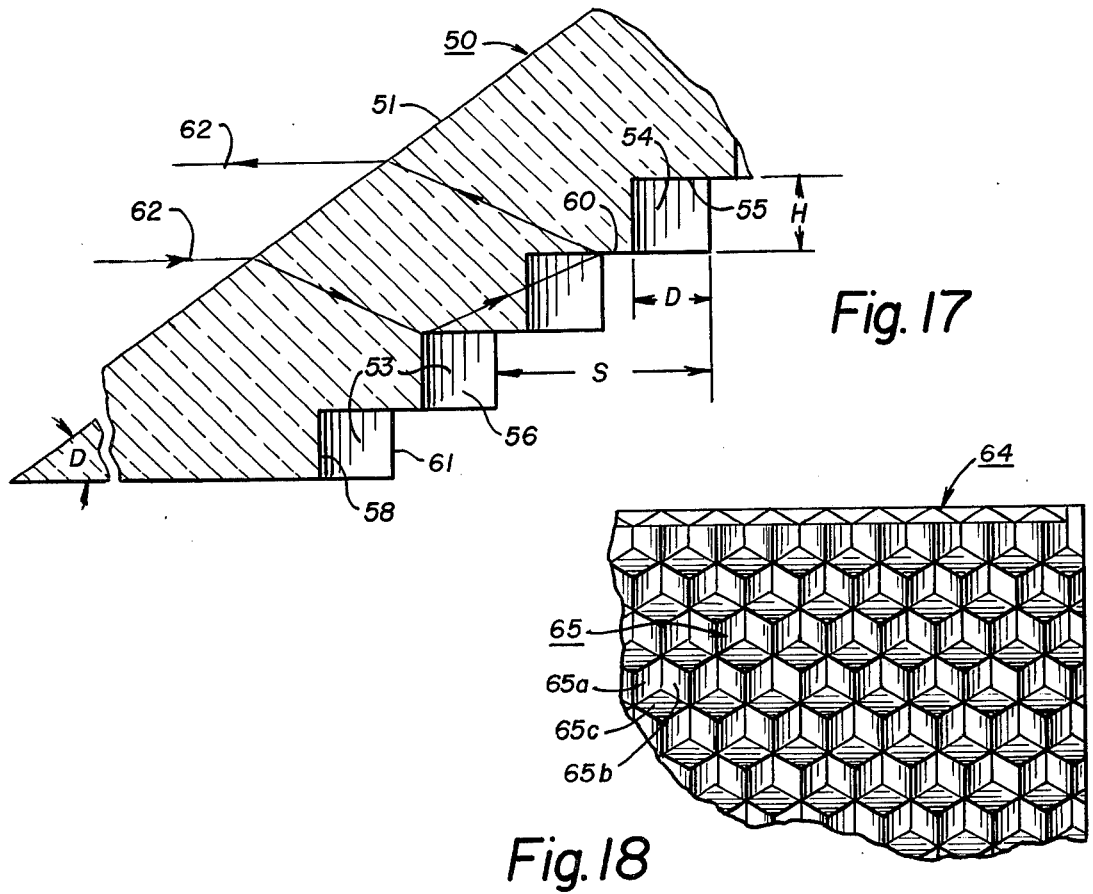
Fig. 17
Fig. 18

MULTI-SIDED RETROREFLECTOR

CROSS-REFERENCE TO RELATED CASE

This application is a continuation-in-part of application, Ser. No. 635,634, filed Nov. 26, 1975.

BACKGROUND OF THE INVENTION

This invention relates to a retroreflector which may be used wherever light reflection is desired. A leading application of the retroreflector is as a roadmarker to provide directional guidance, and therefore it is described with respect to this use.

Roadmarkers are mounted on the surface of a roadway, such as along its center line or shoulders, to delineate paths or lanes for traffic, or at intersections to define stopping lines or cross-lanes for traffic, both vehicular and pedestrian. Markers of this type are mounted in spaced apart relation and serve to guide traffic in following or traversing a roadway, or in following a curve or grade in the roadway. Particularly to assist a driver of a vehicle at night, these markers have light reflectors which catch and return incident beams of light from vehicle headlights back toward the souce of the light. Since automobiles of recent vintage have quite powerful headlights, the use of roadmarkers has become more widespread. Roadmarkers contribute to traffic safety such as when roads are wet from rain. Under certain conditions, such as fog, roadmarkers can be the only means of orienting a driver to a changing direction of a road.

Many forms of light reflectors have been suggested. They usually suffer from one or more limitations, such as reflecting too small a proportion of incident light while an approaching vehicle is still at an appreciable distance. As a result, reflecting markers are often noticed too late by a driver to be of substantial help.

Further, in order to avoid making a roadmarker an obstruction on the road, the marker preferably is designed to protrude only a slight amount from the road. This requirement augments problems of light reflection. Plain ceramic or plastic markers have been used, but they tend only to scatter the light. Light scattering is self-defeating in that it is accompanied by loss of intensity of the reflected light which materially reduces the effectiveness of the marker.

SUMMARY OF THE INVENTION

The principal object of the present invention is to provide a multi-sided retroreflector of relatively simple design which is durable and yet provides efficient retroreflectivity. The present retroreflector is characterized in that all cooperating sides are optically equivalent, such that light retroreflected by such sides is retroreflected in paths substantially parallel to that of the intercepted light. When the reflector elements of each side or face of the retroreflector includes reflecting units of three mutually perpendicular surfaces, a further significant advantage results in that all sides of the retroreflector may be formed by the same forming tool without affecting the optical equivalents of those sides.

In one form, the retroreflector comprises a body having at least two and preferably three retroreflective, substantially planar faces adapted to intercept light that is to be retroreflected. The faces are angularly related to different vertical planes as well as to each other in a horizontal plane. In particular, each reflective face is tilted in the same general direction about a lower portion angularly away from its vertical plane and form an acute angle in a horizontal plane with respect to another vertical plane that is disposed substantially at right angles to the path of the incident light. All four of the angles involved are so interrelated as to make the planar faces substantially equivalent, such that light retroreflected by all of the substantially planar faces is retroreflected in paths substantially parallel to that of the incident light.

In a preferred form, a retroreflective substantially planar face may comprise a light-transmitting layer, formed for example from a light-transmitting organic polymeric resinous material, having a plurality of light-reflecting units. The light-transmitting layer may be in the form of a sheet having front and back, opposed, substantially parallel faces, the front face being the substantially planar face referred to and defining a light-refracting surface. The back face of the sheet contains the plurality of light-reflecting units formed directly into the back face. The reflecting units, themselves, may comprise three mutually perpendicular surfaces, such as a cube corner or a trihedral angle of a rectangular parallelepiped. In either case, the reflecting units are preferably coated with metal to aid in their reflecting function.

The angular relationship between the substantially planar faces of a present retroreflector can be mathematically expressed for ideal conditions for two or more contiguous, cooperating faces.

BRIEF DESCRIPTION OF THE DRAWING

In the accompanying drawing:

FIGS. 6, 7 and 8 are plan, front, and side elevational views, respectively, of a roadmarker embodying another form of the present invention having two sets of three cooperating retroreflective, substantially planar surfaces;

FIGS. 9 and 10 are views of FIG. 6 on the planes of the lines 9—9 and 10—10;

FIG. 11 is a cross-section of FIG. 6 on the line 11—11;

FIG. 16 is a view of FIG. 15 on the plane of the line 16—16;

FIG. 17 is a view similar to FIG. 15 and shows the retroreflective route a beam of light may take with that retroreflective element; and FIG. 18 is a fragmentary, enlarged plan view of a cube-corner array.

DESCRIPTION OF THE PREFERRED EMBODIMENTS

Figure 1:
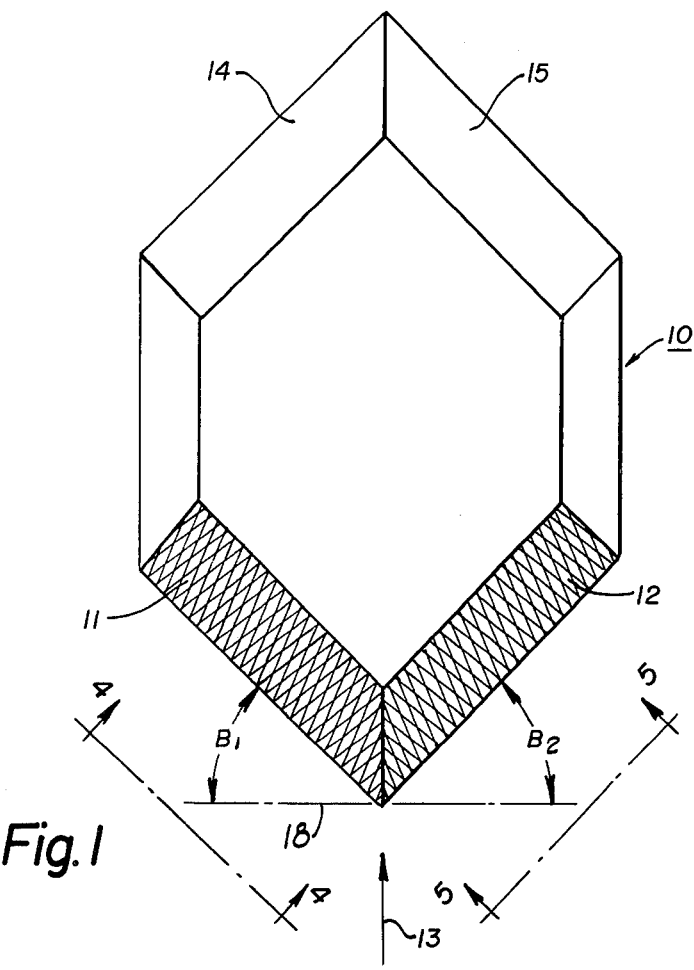
FIGS. 1, 2 and 3 are plan, front, and side elevational views, respectively, of a roadmarker embodying one form of the present invention having two cooperating retroreflective, substantially planar surfaces.
Figure 3:
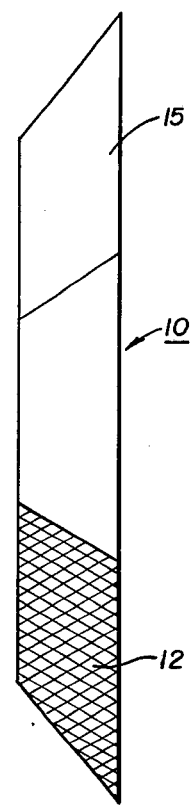
Figure 2:
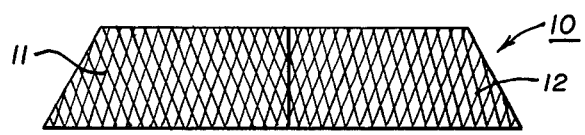

Increased durability for roadmarkers can be obtained by eliminating sharp edges and corners. In order to accomplish this without sacrificing optical performance, all faces of the roadmarker which intercept light, as from oncoming headlights, must be as maximally retroreflective as feasible. A further desideratum is that the same tooling be used for forming all reflective faces in order to reduce expenses and speed production. This can be accomplished by arranging the retroreflective surfaces in such a way that an angle between a normal to the surface and an incident ray of light is the same for each surface.

The present retroreflective body satisfies these conditions by rendering the associated, substantially planar faces optically equivalent. As used here and in the claims, the term "optically equivalent" and forms thereof are taken to mean that the faces receive and redirect incident light in return paths that are substantially parallel to that of the intercepted light.

The physical structures of the various embodiments of the drawing are first described; then the interrelated angulation of the reflecting surfaces inter se; and finally the structures and retroreflection operation of the reflecting elements themselves.

The embodiment of FIGS. 1 through 5 represents a roadmarker generally represented at 10 in the form of a truncated pyramid of hexagonal cross-section of which two contiguous, substantially planar faces 11 and 12 comprise retroreflective elements. The retroreflection of the embodiment of FIG. 1 is unidirectional, that is, it is designed to receive and retroreflect light coming from one general direction, namely, in the general direction of arrow 13 so that faces 11 and 12 intercept the light. The body of roadmarker 10 may be fabricated from any suitable durable, weather-resistant material, such as ceramic, glass, or synthetic resinous plastic material. Such material may be glazed or pigmented, if desired, to impart colors.

The retroreflective faces 11 and 12 may be present in the form of sheets or wafers suitably adhered in place onto the roadmarker, as by natural or synthetic adhesives, or in matching recesses designed to receive the sheets. The retroreflective elements defining faces 11 or 12 may also be fabricated from any durable, light-transmitting, weather-resistant material, such as glass. But preferably such elements are made from synthetic resins such as polycarbonates and especially from the acrylates like polymethacrylate and polymethylmethacrylate resins. The retroreflective elements may be tinted, if desired, to reflect red, yellow or other light, especially if used in a roadmarker. Possible structures of the retroreflective faces 11 and 12 are hereinafter more fully described collectively in connection with the embodiment of FIGS. 6 through 11. If desired, the embodiment of FIG. 1 can be bidirectional, that is, receive and retroreflect light coming from either or both of two opposite directions. In this case, opposed faces 14 and 15 are also optically equivalent, substantially planar retroreflective faces like faces 11 and 12.

Figures 4, 5:
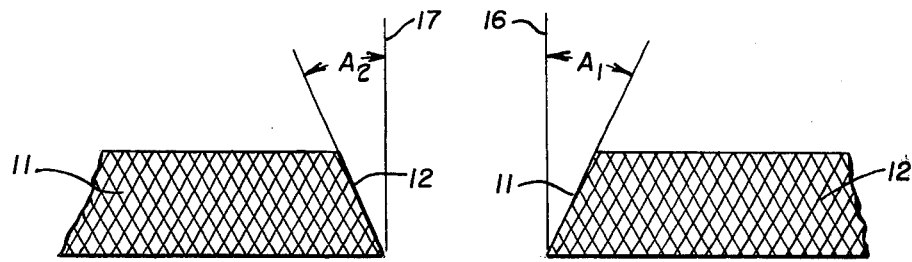
FIGS. 4 and 5 are views of FIG. 1 on the plane of the lines 4—4 and 5—5, respectively.

Each of retroreflective faces 11 and 12 has an angular relationship with a different vertical plane and with respect to each other in a horizontal plane. Face 11 is tilted about a lower portion angularly away from a vertical plane 16 through an angle $A_1$ (FIG. 5). Similarly face 12 is tilted about a lower portion angularly away from a vertical plane 17 through an angle $A_2$ (FIG. 4). Face 11 makes an acute angle $B_1$ in a horizontal plane (FIG. 1) with a second vertical plane 18 which is substantially at right angles to the direction of the approaching light as indicated by arrow 13.

Face 12 likewise makes an acute angle $B_2$ in a horizontal plane with the second vertical plane 18. The four indicated angles are interrelated so as to make faces 11 and 12 optically equivalent as described. Although in the embodiment of FIGS. 1 through 5, angle $A_1$ equals angle $A_2$ and angle $B_1$ equals angle $B_2$, this is not essential. These angles can substantially deviate from one another in value as long as the optical equivalents of faces 11 and 12 is maintained. As a rule, angle $A_1$ and angle $A_2$ normally lie within the range of about 40° to about 75°.

If a retroreflector is made with $n$ reflective surfaces and all of these surfaces are to be formed with the same tooling and to retroreflect light in the same general direction, then the angular relation can be expressed by the following equation, using the angles of FIGS. 1, 4 and 5:

$$\text{Cos } A_1 \times \text{Cos } B_1 = \text{Cos } A_2 \times B_2$$

This equation represents ideal conditions. Substantial deviation in any value for any angle can occur without departing from the advantages of the invention. For example, one or more of the angles of the equation may have a value lying within ± 10% of the value expressed by the equation.

FIGS. 6 through 11 illustrate a preferred embodiment of the present multi-sided retroreflector. A roadmarker generally represented at 20 is in the form of a truncated pyramid of octagonal cross-section of which six substantially planar faces 21, 22, 23, 24, 25, and 26 contain retroreflective elements. Faces 21, 22 and 23 cooperate with one another to form one set of retroreflective faces, while 24, 25, and 26 cooperate to define another set of retroreflective elements. In this manner, roadmarker 20 can receive and return incidental light approaching the roadmarker from either or both of two opposite directions.

Roadmarker 20 can be fabricated from the same materials described for roadmarker 10. FIG. 11 illustrates an alternative construction in which an outer, one-piece shell 27 of a light-transmitting synthetic resin of the type previously disclosed is filled or potted with a relatively rigid filler material in the form of a solid core 28. The core completely fills the interior of shell 27 and contacts its inner surfaces. Core 28 which may be of any solid, weather-resistant material, such as glass, ceramics, synthetic resins, particularly thermosetting resins, reinforces the shell and provides a solid, rugged structure to withstand forces applied to roadmarker 20 as by tires of vehicular traffic. The inside surfaces of shell 27 forming faces 21 through 26 have light-reflecting units hereinafter more fully described. In this instance, an adhesive between shell 27 and core 28 is not usually employed, the material of core 28 providing its own adhesion to the shell.

The retroreflective operation of faces 24, 25 and 26 is the same as that of faces 21, 22, and 23 and, therefore, only the latter set of faces is described in detail. The embodiment of FIG. 6 is a special case of that of FIG. 1 in which there is a frontal substantially planar face and two other substantially planar faces laterally and rearwardly disposed from the frontal face. These faces also have an angular relation both from a vertical plane and with respect to each other. In particular, face 22 is tilted about a lower portion away from a vertical plane 30 through an angle X (FIG. 8), the plane being adapted to be disposed substantially at right angles to the approaching direction of incident light. Each of faces 21 and 23 is similarly tilted about a lower portion away from vertical planes 31 and 32 through angles $Y_1$ and $Y_2$, respectively. Face 21 makes an acute angle $Z_1$ in a horizontal plane with vertical plane 30, and face 23 makes an acute angle $Z_2$ in a horizontal plane with vertical plane 30 (FIG. 6).

The angles X, $Y_1$, $Y_2$, $Z_1$, and $Z_2$ are interrelated so as to make faces 21, 22 and 23 optically equivalent as herein defined. In a preferred and special case (which is not essential to the invention), angle $Y_1$ equals angle $Y_2$ and angle $Z_1$ equals angle $Z_2$. In this arrangement and representing ideal conditions, the relationship among such angles is represented by the equation:

$$\cos X = \cos Y \times \cos Z$$

All faces 21, 22, and 23 can retroreflect light in the same general direction and can be made with the same tooling, even though there is substantial deviation in any value for any angle from this equation, without departing from the advantages of the invention. For example, one or more of said angles may have a value lying within ± 10% of the value stated in the equation, although deviations exceeding even this value are permissible in one or more angles as long as the optical equivalence of faces 21, 22, and 23 is maintained. As a rule, and as a basis for a starting calculation, angle A normally lies within the range of about 40° to about 75°.

Considering next the structure, itself, of the retroreflective, substantially planar faces, the following applies for any of the faces of any of the embodiments, whether it be for face 11, 12, 21, 22, 23, 24, 25, or 26. In keeping with the advantage of the present invention that the same forming tool be used to form all retroreflective faces and yet achieve retroreflection in substantially the same direction from those same faces, it is preferred although not essential that the retroreflective faces have a plurality of light-reflecting units comprising three mutually perpendicular surfaces. Conveniently, the retroreflective element comprises a layer or sheet having such light-reflecting units formed in its back side or face.

Light-reflecting units of three mutually perpendicular surfaces may include those in which the three surfaces define a trihedral angle of a rectangular parallelepiped as disclosed and claimed in my copending application, Ser. No. 635,634. Or such light-reflecting units may comprise cube-corners. FIGS. 12 through 17 illustrate light-reflecting units of a rectangular parallelepiped imprint, while FIG. 18 illustrates units having a cube-corner construction.

For purposes of illustration and disclosure, the light-reflecting units of structural shell 27 of FIG. 11 are described, but it will be understood that strips, wafers, films, sheets, and the like of the same construction as the slanting sides of shell 27 can be used to form faces 11 and 12 of the embodiment of FIG. 1 and the faces 21, 23, 24, 25, and 26 of the embodiment of FIG. 6.

Referring more particularly, then, to a retroreflective element that may be used in any embodiment of the present retroreflector, this component is in the form of a sheet 33 having front and back, opposed, substantially parallel faces indicated at 34 and 35, respectively. Front face 34 is substantially smooth and defines a light-refracting surface. Back face 35 has a plurality of light-reflecting units generally represented at 36 which preferably are formed directly into the back face by a suitable mold, forming dies, or the like from an original plane face indicated by the broken, imaginary line 37 in FIG. 12, such that preferably the outer corners of the units 36 are coplanar with line 37 as illustrated. Here and elsewhere in the drawing, it will be appreciated that the light-reflecting units are shown greatly oversize to facilitate their illustration and description.

Figure 12:
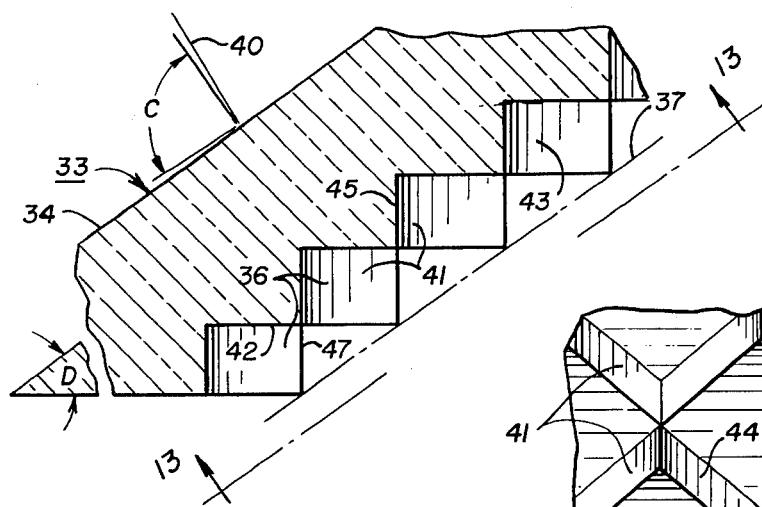
FIG. 12 is a greatly enlarged, fragmentary view of a retroreflective sheet that may be used in the embodiments of FIGS. 1 or 6 and illustrates light-reflecting units of three mutually perpendicular surfaces arranged in stepped rows or tiers.

To aid in their reflecting function, light-reflecting units 36 may be coated with metal or metalized in a manner known in the art to form a metallic layer 38 (FIG. 11). Aluminum is the preferred metal for this purpose. To relate the relative position of the retroreflective sheet 34 to approaching light which is generally considered to travel in straight lines, a sheet like sheet 34 is preferably disposed in an angled position such that a normal, that is a line perpendicular to the sheet, is at an angle of about 5° to about 85°, and preferably from about 30° to about 85°, from an incident beam of light. Accordingly, if line 40 in FIG. 12 represents a normal to front face 34 of the retroreflective sheet, the sheet is in position to receive and retroreflect light approaching the sheet within the angle C which represents an angle of about 5° to about 85° from line 40. Such an angle C applies as well to laterally disposed faces, such as 21 and 23, where even though the light approaches those faces obliquely it does so within angle C.

In practice, the retroreflector is usually positioned to receive and retroreflect light traveling generally in a horizontal plane, such as in a road sign or a roadmarker. While the above described angulation is important and paramount in all forms of the present invention, as a further indication of the angulation involved and when the retroreflector is used to intercept horizontally traveling light, the angle D sheet 33 makes with the horizontal may be within the range of about 5° to about 60°. When the retroreflector is part of a roadmarker, the angle D sheet 33 makes with the horizontal may be within the range of about 15° to about 45°, since a roadmarker is normally lower in elevation with respect to the approaching light. However, these angulations are secondary to the angulation previously described which controls in all cases.

The back face 35 of retroreflective sheet 33 comprises light-reflecting units generally represented at 36 in the embodiment of FIG. 11 which cover an appreciable area of the back face and preferably are coextensive with that face. The resulting array of light-reflecting units provides a more even distribution of light reflection with little or no blind spots. The array of all the light-reflecting units forms a multifaceted reflecting surface which totally retroreflects light in a particular direction.

In a preferred form, the array of light-reflecting units is stacked to form a series of steps or rows 41 or units which extend transversely across back face 35. As shown in FIG. 12, when the retroreflective sheet is in use and angled as previously described, rows 41 are laterally spaced from one another due to their generally vertical disposition. It is, therefore, not merely a matter of stacking rows 41 atop one another; rather they are preferably laterally offset with respect to each other as shown. While size is not critical, light-reflecting units 36 have been shown oversized in the drawing for purposes of illustration. In one embodiment, each row was about 1/16 inch in height and the rows were spaced laterally (or horizontally as viewed in FIG. 12) about 1/16 inch.

Figure 13:
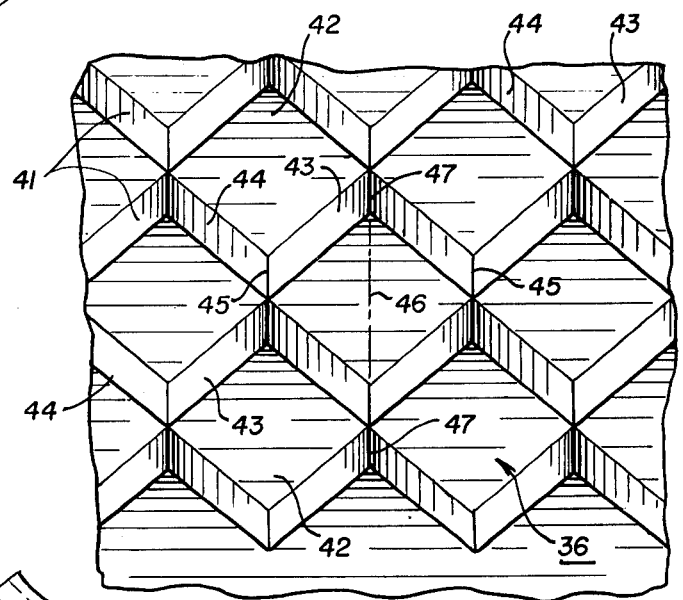
FIG. 13 is a view of FIG. 12 on the plane of line 13—13.
Figure 15:
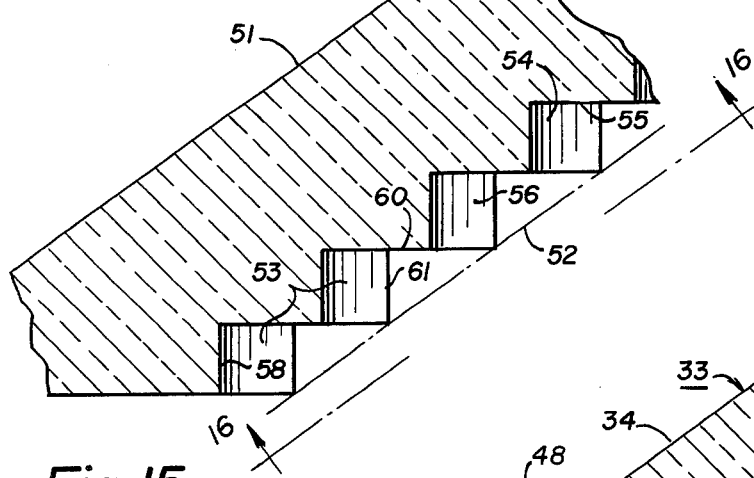
FIG. 15 is a greatly enlarged, fragmentary view, similar to FIG. 12, of a modified form of those reflecting units.
Figure 14:
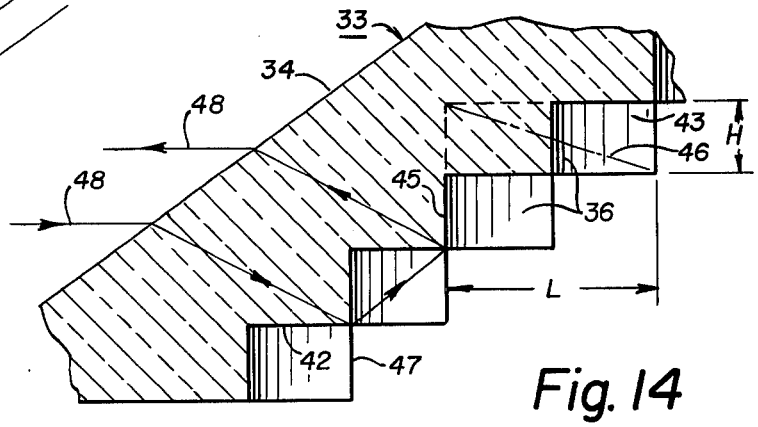
FIG. 14 is a view similar to FIG. 12 and shows the retroreflective route a beam of light may take with that retroreflective element.

The embodiment of FIGS. 12, 13, and 14 illustrates a preferred form of light-reflecting units of the rectangular parallelepiped type, while the embodiment of FIGS. 15, 16 and 17 represent a modified form. The light-reflecting units of both embodiments comprise units of three mutually perpendicular surfaces defining a trihedral angle of a rectangular parallelepiped, just as though a corner of a rectangular parallelepiped was pressed against the back face of the retroreflective sheet while it was deformable in order to form the unit. In the preferred practice, such a corner penetrates into the sheet until the remote edges of the two vertically disposed sides of the rectangular parallelepiped reach the back face of the sheet.

If a polyhedron is a solid bounded by planes, and a prism is a polyhedron of which two faces are congruent polygons in parallel planes, and the other faces are parallelograms having two of their sides in the two parallel planes, a parallelepiped may be broadly defined as a prism whose bases are parallelograms. A right parallelepiped, then, is a parallelepiped with edges perpendicular to the bases. As used here and in the claims, the term "rectangular parallelepiped" means a right parallelepiped whose bases are rectangles.

Of the three surfaces of the light-reflecting units of all illustrated embodiments of the parallelepiped construction, one surface is horizontally disposed when the retroreflector sheet 33 is in the angled position of about 5° to about 85° from an incident beam of light, and the other two of the surfaces are vertically disposed and intersect each other in a direction toward the front face of the retroreflector to form an intersection line. As used here and in the claims, the term "horizontally disposed" is taken to mean generally horizontal, that is, more horizontal than vertical, and not an exact, true horizontal direction. Similarly, as used here and in the claims, the term "vertically disposed" is taken to mean generally vertical, that is, more vertical than horizontal and not an exact, true vertical direction.

For example, in the embodiment of FIGS. 12, 13 and 14 at least some of the light-reflecting units 36 comprise three mutually perpendicular surfaces defining a trihedral angle of a rectangular parallelepiped as described. One surface 42 is horizontally disposed when retroreflective sheet 33 is in the described angled position, and two surfaces 43 and 44 are vertically disposed and intersect each other in a direction toward front face 34 to form an intersection line 45. A light-reflectng unit 36 is so positioned with respect to front face 34 that a body diagonal of a rectangular parallelepiped, as illustrated in phantom at 46 in FIGS. 13 and 14, is preferably substantially parallel to and at least within an angle of about 15° of incident light refracted by face 34. The body diagonal is a straight line drawn from the trihedral angle formed by surfaces 42, 43 and 44 to the opposite trihedral angle of the rectangular parallelepiped.

While the light-reflecting units of any embodiment may be spaced from one another along a given row and rows may likewise be spaced from one another, it is preferred that the light-reflecting units adjoin one another in a row without spacing therebetween and that consecutive rows be contiguous to each other without spacing therebetween. Where the units within a row have no spacing therebetween, the vertically disposed surfaces, such as surfaces 43 and 44 of the embodiment of FIGS. 12, 13 and 14 intersect vertically disposed surfaces of adjoining light-reflecting units 36 in a direction away from front face 34 to form a second intersecting line 47. This line is not only substantially parallel to the first mentioned intersection line 45 but, in the embodiment of FIGS. 12, 13 and 14 is substantially aligned with an intersection line 45 of an adjacent higher row 41.

FIG. 14 illustrates the retroreflective route of an isolated beam of light represented at 48 for the embodiment of FIG. 12. The beam is first refracted by front face 34 and directed toward light-reflecting units 36. Upon striking any one of the three contiguous surfaces 42, 43, or 44 (shown as first striking a horizontally disposed surface 42 in FIG. 12), beam 48 is reflected in turn by the three faces and returned substantially parallel to its incident direction. In a special case, if sheet 33 is adapted to receive horizontally directed light and makes an angle D with the horizon, surface 42 is a square, surfaces 43 and 44 are identical rectangles, each row 41 has a vertical height H in inches (FIG. 14), the overall horizontal length of two reflecting units of two adjacent rows is L in inches, and sheet 33 has an index of refraction of light $n$, in the ideal situation these values have substantially the relation:

$$\cos D = n \cos \left\{ \tan^{-1} \left[ \frac{3\frac{H}{L}}{1 - 2\frac{H^2}{L^2}} \right] \right\}$$

When these values are exactly met, the path of beam 48 of light in FIG. 14 within the retroreflective sheet 33 is exactly parallel to the body diagonal 46 of the rectangular parallelepiped. However, it will be apparent that deviations from one or more of these values may be taken without losing the advantages of the present invention.

FIGS. 15, 16 and 17 illustrate a modified form of the invention. This form differs from that of FIGS. 12, 13 and 14 principally in that the rows of light-reflecting units are spaced farther apart in a horizontal direction as viewed in FIG. 15, so that a land or continuous plane is formed between adjacent rows which extends transversely across the back of the retroreflective sheet.

More particularly, the retroreflecting sheet 50 of FIG. 15 is positioned in use, like the embodiment of FIGS. 12, 13 and 14 at an angle of about 5° to about 85° and preferably from about 30° to about 85° from an incident beam of light. Sheet 50 has front and back, opposed, substantially parallel faces shown at 51 and 52, respectively, back 52 being formed along the plane of the line bearing this reference number. Front face 51 is substantially smooth and defines a light-refracting surface, while back face 52 has a plurality of light-reflecting units formed into that face and generally represented at 53. Rows 54 of units 53 are formed into the back face and extend transversely across the back of sheet 50. At least some of the reflecting units comprise three mutually perpendicular surfaces defining a trihedral angle of a rectangular parallelepiped as previously described. One surface 55 is horizontally disposed when sheet 50 is in the angled position, and the other two surfaces 56 and 57 are vertically disposed and intersect each other in a direction toward front face 51 to form an intersection line 58. In this case, however, the horizontally disposed surfaces 55 of each unit are continuous with respect to each other in a given row (FIG. 16), so that a land or continuous plane indicated at 60 is formed.

The vertically disposed surfaces 56 and 57 of at least some of the light-reflecting units 53 can be spaced apart or preferably intersect vertically disposed surfaces of adjoining light-reflecting units 53 in a direction away from front face 51 to form a second intersection line 61 that is substantially parallel to the first mentioned intersection line 58. As shown especially in FIG. 15, the second intersection line 61 of one row 54 is spaced laterally of the first mentioned intersection line 58 of an adjacent row.

FIG. 17 illustrates the retroreflective route of an isolated beam of light represented at 62 for the embodiment of FIGS. 15 and 16. The beam is first refracted by front face 51 and directed toward light-reflecting units 53. Upon striking any one of the three contiguous, mutually perpendicular surfaces 55, 56 or 57 (shown as first striking a horizontally disposed surface 55), beam 62 is reflected in turn by the three surfaces and returned substantially parallel to its incident direction. In a special case, if the retroreflective sheet 50 forms an angle D with the horizontal, each row 54 has a vertical height H in inches (FIG. 17), the horizontal length of each reflecting unit is D in inches, and the overall horizontal length of two reflecting units of two adjacent rows 54 is S in inches, in the ideal situation these values have substantially the relation:

$$\tan D = H/(S-D)$$

When these values are exactly met, the retroreflective path of the beam of light 62 is exactly parallel to the incident beam of light 62, if the retroreflective sheet 50 is disposed so as to receive the incident beam of light within angle D as described for FIG. 12. However, it will be appreciated that deviations from one or more of these values may be taken without losing advantages of the present invention.

The light-reflecting units of any substantially planar retroreflective face of the present retroreflector may comprise cube-corners as in a cube-corner array. The term "cube-corner" is an art recognized term and refers to a well known triple mirror reflecting principal as described, for example, in U.S. Pat. No. 1,671,086 to Stimson. If three reflecting surfaces are arranged at right angles to each other and intersect at a common point, they form the inside corner of a cube. A beam of light incident on such a cube-corner is reflected from surface to surface and then back along the same general direction taken by the arriving light beam. Such a construction may also be termed a central triple reflector.

Each cube-corner has an axis and the axes of all the cube-corners are generally parallel to one another. Although such axes are preferably parallel to each other, this does not mean that the axes must be normal to a front face as herein defined or to an array of cube-corners, as shown, for example, by U.S. Pat. No. 3,332,327 to Heenan. Processes and apparatus for making cube-corners are also described in U.S. Pat. Nos. 1,591,572 and 1,906,655, both issued to Stimson. The disclosure of the patents herein cited are hereby incorporated by reference.

FIG. 18 shows in plan view the nature of one cube-corner reflector 64 in sheet form. Each cube-corner such as that represented at 65 has three reflecting surfaces, 65a, 65b and 65c disposed at right angles to each other and intersecting at a common point. It is understood that this illustrates only one example of a cube-corner sheet or wafer which may be substituted for sheets 33 or 50, for example, and that other configurations and spacings are possible. As a rule, to obtain excellent retroreflectivity, it is preferred but not essential that the cube-corners are so oriented that an axis passing through a cube-corner makes an acute angle with the front, refracting face of the sheet forming the retrorefractive element. The cube-corners themselves are usually remote from a smooth refracting face and can be metallized in a known manner to increase reflection. Aluminum is the preferred metal for this purpose.

It will be noted that none of the light-reflecting units has reentrant surfaces and therefore the units are easily molded. A projection of the array of units formed by three mutually perpendicular surfaces, that is, of just the units alone, forms a like array of hexagons filling the projection plane. Accordingly, tools for forming molds to shape the reflecting surfaces can be made from pins of hexagonal cross-sections having three mutually perpendicular planar faces machined on the end of each pin. At least in the embodiment of FIG. 14, body diagonal 46 of a rectangular parallelepiped can be parallel to the lateral edges of such pins under the ideal situation where diagonal 46 is exactly parallel to the refracted incident light.

It will be apparent that any light-reflecting unit can, if desired, be metallized to aid in its reflecting function as described in connection with FIG. 11. In the remaining figures, this metallization has not been shown to facilitate illustration of the structure of the light-reflecting units.

Although the foregoing describes several embodiments of the present invention, it is understood that the invention may be practiced in still other forms within the scope of the following claims.

I claim:

1. A multi-sided retroreflective body having at least two retroreflective substantially planar faces adapted to intercept light that is to be retroreflected, each face having a predetermined angular relationship with the other and each containing a plurality of light-reflecting units, each unit comprising three mutually perpendicular surfaces, each of said at least two retroreflective faces being tilted in the same general direction about a lower portion angularly away from a vertical plane and being angularly related in a horizontal plane with respect to another vertical plane disposed substantially at right angles to the direction of said light to define said angular relationship, all four of said angles being so interrelated as to make said at least two retroreflective faces substantially optically equivalent, such that light passing through said another vertical plane is retroreflected by both of said two retroreflective faces in return paths substantially parallel to that of the intercepted light.

2. The retroreflective body of claim 1 in which said body is a roadmarker.

3. The retroreflective body of claim 1 in which at least one of said substantially planar faces comprises a light-transmitting layer having said plurality of light-reflecting units.

4. The retroreflective body of claim 1 in which said planar faces are tilted away from said vertical planes through angles $A_1$ and $A_2$, respectively, and said faces make acute angles $B_1$ and $B_2$, respectively, in a horizontal plane with said another vertical plane, said angles having substantially a relationship established by the equation:

$$\cos A_1 \times \cos B_1 = \cos A_2 \times \cos B_2$$

5. The retroreflective body of claim 1 in which the three mutually perpendicular surfaces of said light reflecting units define cube-corners, and said cube corners are oriented such that an axis passing through a cube corner makes an acute angle with a planar face.

6. The retroreflective body of claim 1 in which the three mutually perpendicular surfaces of said light reflecting units define trihedral angles of a rectangular parallelepiped, and said surfaces are positioned with respect to a planar face that the body diagonal of a rectangular parallelepiped is within an angle of about 15° to incident light refracted by said planar face.

7. The retroreflective body of claim 1 in which said planar faces are tilted away from said vertical planes through angles $A_1$ and $A_2$, respectively, and said faces make acute angles $B_1$ and $B_2$, respectively, in a horizontal plane with said another vertical plane, said angles having a relationship established by the equation:

$$\cos A_1 \times \cos B_1 = \cos A_2 \times \cos B_2$$

one or more of said angles having a value lying within ± 10% of the value required by said equation.

8. The retroreflective body of claim 7 in which each of said angles $A_1$, and $A_2$ is within the range of about 40° to about 75°.

9. The retroreflective body of claim 1 in which at least one of said substantially planar faces includes a retroreflective element comprising a light-transmitting sheet having front and back, opposed, substantially parallel faces, the front face being said substantially planar face and defining a light-refracting surface, the back face of the sheet having said plurality of light-reflecting units.

10. The retroreflective body of claim 9 in which the exposed areas of at least some of said light reflecting units are coated with metal to aid in their reflecting function.

11. The retroreflective body of claim 9 in which said sheet comprises a light-transmitting organic polymeric resinous material.

12. The retroreflective body of claim 9 in which said light-reflecting units includes rows of said units extending transversely across said back face and formed over an appreciable area of said face.

13. The retroreflective body of claim 12 in which said rows are contiguous to each other without spacing therebetween.

14. The retroreflective body of claim 12 in which said light-reflecting units of each row adjoin one another without spacing therebetween.

15. A multi-sided retroreflective body having at least three retroreflective, substantially planar, cooperating faces adapted to intercept light that is to be retroreflected;
 a. said faces including a first face and second and third faces laterally and rearwardly disposed from said first face, and first, second, and third faces having a predetermined angular relationship with respect to each other;
 b. each face having a plurality of light-reflecting units, each unit comprising three mutually perpendicular surfaces;
 c. said first face being tilted about a lower portion away from a first vertical plane through an angle X having a value within the range of about 40° to about 75°, said first vertical plane being adapted to be disposed substantially at right angles to the approaching direction of said light, each of said second and third faces being tilted about a lower portion away from second and third vertical planes, respectively, through an angle Y, and each of second and third faces making an acute angle Z in a horizontal plane with said first vertical plane; and
 d. said angles having a predetermined relationship established by the equation:

$$\cos X = \cos Y \times \cos Z,$$

one or more of said angles having a value lying within ± 10% of the value required by said equation to make said three planar faces substantially optically equivalent, such that light passing through said first vertical plane is simultaneously maximally retroreflected by all three of said planar faces and directed in return paths substantially parallel to that of the intercepted light.

16. The retroreflective body of claim 15 in which said substantially planar faces have retroreflective elements, each element comprising said light-transmitting layer provided with a plurality of light-reflecting units.

17. The retroreflective body of claim 15 in which at least one of said substantially planar faces includes a retroreflective element comprising a light-transmitting sheet having front and back, opposed, substantially parallel faces, the front face being said substantially planar face and defining a light-refracting surface, the back face of the sheet having said plurality of light-reflecting units.

18. The retroreflective body of claim 15 in which said three mutually perpendicular surfaces of the light reflecting units define cube corners, and said cube corners are oriented such that an axis passing through a cube corner makes an acute angle with a planar face.

19. The retroreflective body of claim 15 in which said three mutually perpendicular surfaces of the light reflecting units define trihedral angles of a rectangular parallelepiped, and said surfaces are positioned with respect to a planar face that the body diagonal of a rectangular parallelepiped is within an angle of about 15° to incident light refracted by said planar face.

20. The retroreflective body of claim 15 in which said angles X, Y, and Z have substantially a relationship established by the equation:

$$\cos X = \cos Y \times \cos Z$$

21. The retroreflective body of claim 15 in which said light-reflecting units have the same construction for all of said three faces.

* * * * *